US008482670B2

(12) United States Patent
Caviedes et al.

(10) Patent No.: US 8,482,670 B2
(45) Date of Patent: Jul. 9, 2013

(54) DETECTING VIDEO FORMAT INFORMATION IN A SEQUENCE OF VIDEO PICTURES

(75) Inventors: Jorge E. Caviedes, Mesa, AZ (US); Mahesh M. Subedar, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 13/157,461

(22) Filed: Jun. 10, 2011

(65) Prior Publication Data

US 2011/0242424 A1 Oct. 6, 2011

Related U.S. Application Data

(63) Continuation of application No. 11/234,979, filed on Sep. 26, 2005, now Pat. No. 7,982,805.

(51) Int. Cl.
  *H04N 5/46* (2006.01)
  *H04N 5/14* (2006.01)
(52) U.S. Cl.
  USPC ............ 348/558; 348/700; 348/571; 348/441
(58) Field of Classification Search
  USPC .................. 348/558, 700, 571, 441, 701, 97, 348/448, 446, 443, 911
  See application file for complete search history.

(56) References Cited

U.S. PATENT DOCUMENTS 7,129,990 B2 10/2006 Wredenhagen et al.
7,382,417 B2 6/2008 Caviedes

FOREIGN PATENT DOCUMENTS

EP 0 720 367 A2 7/1996
WO 2006/071835 A1 7/2006

OTHER PUBLICATIONS

PCT International Search Report and Written Opinion for Application No. PCT/US2006/036152 dated Sep. 14, 2006, 16 pages.
A. Bovyrin et al., "Fast Extraction of Scene Structure Based on Gradient Runs Analysis", Proceedings 2002 Intl. Conference on Image Processing, ICIP 2002, Rochester, NY, Sep. 22-25, 2002, IEEE, US, vol. 2 of 3, Sep. 22, 2002, pp. 757-760.

*Primary Examiner* — Jefferey Harold
*Assistant Examiner* — Jean W Desir
(74) *Attorney, Agent, or Firm* — Trop, Pruner & Hu, P.C.

(57) ABSTRACT

Gradient analysis may be utilized to determine frame and field repeat patterns in input video data. Those frame and field repeat patterns may then be analyzed to match them with characteristic patterns associated with telecine 3:2 and 2:2 pulldown video data, for example. In addition, a progressive detector may use combing analysis to determine whether or not a particular field is progressive or interlaced data. Then, this information, together with a field flag which indicates whether field or frame analysis is appropriate, may be utilized to distinguish telecine 2:2 or 3:2 pulldowns and interlaced and progressive data in some embodiments.

22 Claims, 10 Drawing Sheets

DETECTING VIDEO FORMAT INFORMATION IN A SEQUENCE OF VIDEO PICTURES

CROSS-REFERENCE TO RELATED APPLICATIONS

This application is a continuation of U.S. patent application Ser. No. 11/234,979, filed on Sep. 26, 2005 now U.S. Pat. No. 7,982,805.

BACKGROUND

This invention relates generally to identifying the received video content, for example, in connection with televisions.

Input video, such as input television, can have different video formats, including progressive or interlaced with various numbers of frames per second. Typical formats include 60 frames per second progressive, 60 fields per second interlaced, 50 frames per second progressive, and 50 fields per second interlaced.

The original video content may have been in a format associated with motion pictures. That content may, for example, be 24 frames per second progressive, 25 frames per second progressive, or 30 frames per second progressive, to mention a few examples. The original content may be converted to one of the interlaced formats described above by field or frame repetition. One field or frame repetition technique is telecine.

It is desirable to determine how the fields or frames of original video were repeated to create the higher frames per second and to determine whether the data is an interlaced or progressive format. This ensures appropriate handling of the video data. For example, certain video formats are inappropriate for display in large screen televisions. Video content for large screen display may be converted to an appropriate format. For example, telecine interlaced data may not be suitable for large screen televisions. The telecine data, based on original progressive frames, may be processed to recover those progressive frames before scaling for large screen display.

DETAILED DESCRIPTION

In accordance with some embodiments, the format of video data that is received by a video apparatus, such as computer, a television set, or a media display device, may be determined. Initially, a determination may be made as to how the fields or frames that make up the video data repeat or fail to repeat. In one embodiment, a technique known as gradient analysis is used to identify the repeat patterns.

Information may be obtained about whether the video data is received in field format or frame format. Conventional interlaced data may be presented in field format and progressive data may be presented in frame format. But sometimes data which is presented in field format includes a field which is actually in progressive format. Thus, techniques, such as a combing analysis, may be utilized in some embodiments to determine whether particular data, received in field format, actually is progressive data.

Finally, all of this data may be analyzed to identify the video format. For example, the determination may be made as to whether the data is interlaced or progressive and whether it is in a telecine 3:2 pulldown or telecine 2:2 pulldown.

Figure 1:
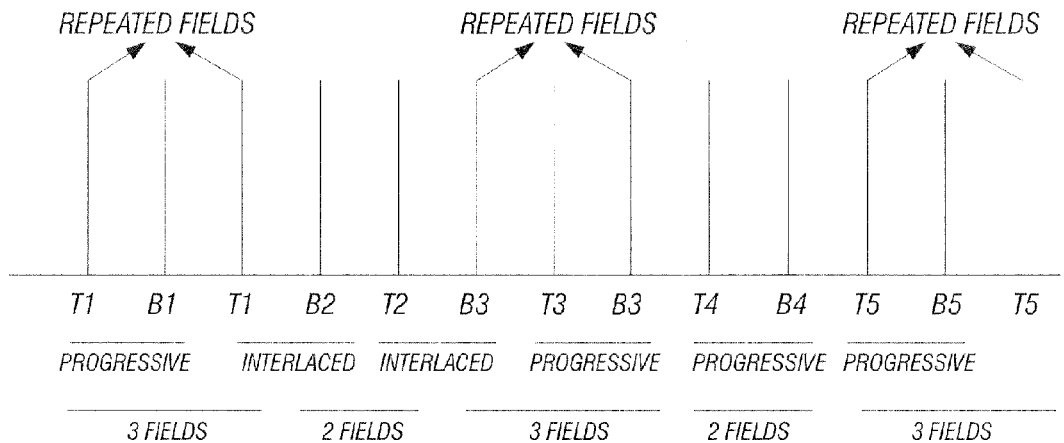
FIG. 1 is a depiction of the field repeat pattern for telecine 3:2 pulldown interlaced video data at 60 frames per second interlaced.

Referring to FIGS. 1-4, examples of video formats are illustrated. FIG. 1 depicts telecine 3:2 pulldown interlaced video at 60 fields per second interlaced. This case occurs when 24 frames per second picture content is displayed at 60 fields per second interlaced sequence.

The field repeat pattern is depicted in FIG. 1. An initial or top field T1 is repeated immediately after displaying the bottom field B1. Similarly, the bottom field B3 of the third frame is repeated after the top field T3 of the third frame. Finally, the top field T5 of the fifth frame is repeated after the bottom field B5 of the fifth frame.

The first top and bottom fields T1, B1 are a progressive frame and the second top field T1 and bottom field B2 amount to an interlaced frame. The breakdown of each group of data in terms of fields is also depicted.

In some embodiments, six frames (12 fields) or less may be utilized to determine the type of video content. In the case of 3:2i (i.e., telecine 3:2 pulldown interlaced) in 60 fields per second, the repeat pattern is a field repeat pattern. Its distinctive characteristic is that the fields are repeated, not consecutively, but in an alternating basis. Thus, a single field may be repeated a single time after an unrepeated field.

Generally, a field flag indicates whether or not the data is received in fields or frames. In the case of 3:2i, the field flag is 1, which indicates that the data is in fields. The number of progressive frames that are detected within the window size may also characterize the 3:2i format. The number of progressive frames is equal to the window size (e.g., six frames) minus three. A six frame window has 12 fields. For the 12 fields depicted in FIG. 1, there are three progressive frames indicated. Thus, the number of progressive frames that would be detected is equal to the window size minus three.

Figure 2:
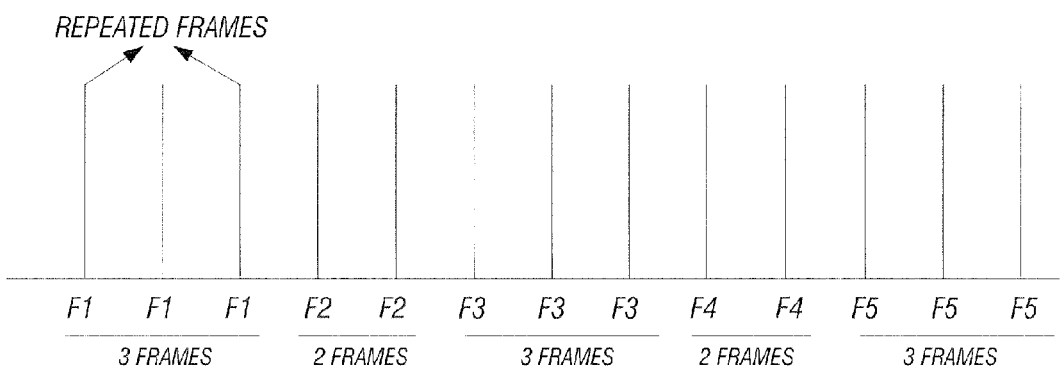
FIG. 2 is a depiction of the frame repetition pattern for telecine progressive video data presented as 60 frames per second progressive.

Moving to FIG. 2, this case is a telecine 3:2 pulldown progressive (3:2p) at 60 frames per second progressive. This 3:2p case occurs when 24 frames per second picture content is displayed as 60 frames per second progressive. Here, the repeat pattern is a frame repeat pattern and three frames are repeated one after the other. Thus, there is one repeat of the same frame. The field flag is one, indicating field format. The number of progressive frames detected would also equal the window size. In other words, every frame is a progressive frame.

Figure 3:
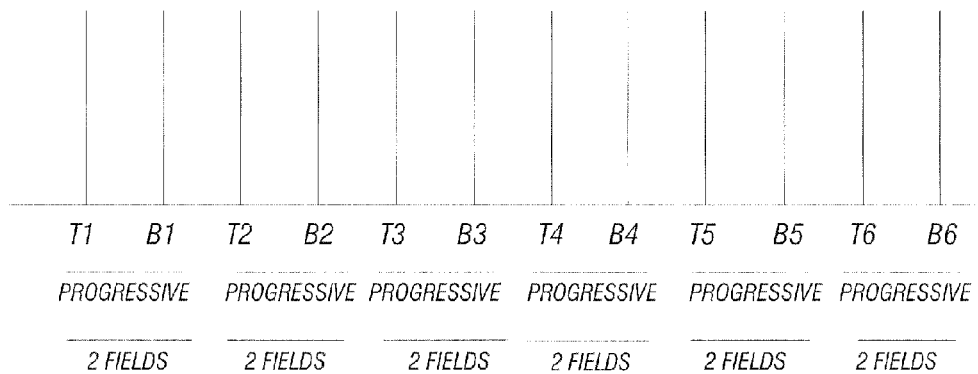
FIG. 3 is a depiction of the lack of a repeat pattern in 2:2 pulldown interlaced video data at 60 frames per second interlaced.

Next, referring to FIG. 3, telecine 2:2 pulldown interlaced at 60 fields per second interlaced is depicted. This case occurs when 30 frames per second content is displayed at 60 fields per second interlaced. Each progressive frame is displayed in fields. There is no expected repeat of frames or fields. For a window of six frames of data, all frames are progressive. Thus, there is an absence of any repeat pattern and the field flag would again be equal to one. A progressive detector indicates that the fields are progressive. The number of progressive frames detected in a window of six frames is equal to the window size.

Figure 4:
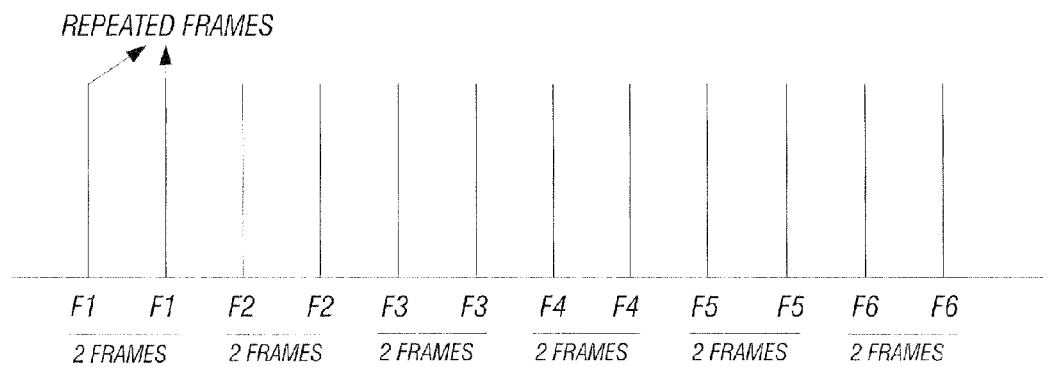
FIG. 4 is a depiction of the frame repeat pattern for 2:2 pulldown progressive video data and 60 frames per second progressive video data.

Finally, referring to FIG. 4, a telecine 2:2 pulldown progressive (2:2p) sequence is shown. In this case, 30 frames per second of original content are displayed at 60 frames per second progressive sequence. Each progressive frame is repeated one time. Thus, one frame repeats and this would occur three times within a window of six frames. The field flag is equal to zero, indicating that the data is received as frames. The number of progressive frames that would be detected would, again, equal the window size since every frame is progressive.

Thus, one thing that needs to be determined in order to determine what type of video data is received is the field or frame repeat pattern. In some embodiments, the repeat pattern may be detected using a gradient analysis. A gradient analysis looks at the change in intensity of pixels versus their position. In one embodiment, the change of intensity may be determined pixel by pixel down a column. However, in other embodiments, horizontal or row-wise gradient runs may also be determined.

A gradient run is two or more side-by-side pixels with each successive pixel increasing or decreasing in intensity relative to its neighbor by at least a threshold value. In one embodiment, the threshold value may be five in an eight-bit system in which the intensity or luminance values extend from zero to 255.

Gradient run features are initially extracted from two temporally consecutive pictures (fields or frames). The previous image does not need to be stored, only the set of features. The features are related to luminance and edge information, but edge information may be computed as gradient runs. These features may include but are not limited to a. Average luminance. The average luminance of each picture may be computed. The average luminance of each picture may be determined by subsampling all or a portion (for example, every other pixel) of the pixels in the image and calculating an average.

b. Average luminance at vertical edges. The average luminance at edges detected in the vertical direction of each frame may be calculated. When a vertical edge is detected, the average luminance along that edge is detected to determine whether the whether the vertically detected picture edges are light or dark on average.

c. Average luminance at horizontal edges. The average luminance at edges detected in the horizontal direction of each frame is calculated as well.

d. Number of horizontal gradient runs (horizontal edges). The number or approximate number of horizontal edges is determined. This value may be scaled for convenience.

e. Number of vertical gradient runs (vertical edges). The number or approximate number of horizontal edges is determined. This value may be scaled for convenience.

f. Sum of run lengths of horizontal gradient runs. Horizontal gradient runs are approximations of the edges detected in the horizontal direction. The lengths of the horizontal gradient runs are added together. The length is the distance between the ends of a run. The sum of gradient run lengths is less or equal than the length of the line. This value may be scaled for convenience.

g. Sum of lengths of vertical gradient runs. The lengths of the vertical gradient runs are added together as well. This value may be scaled for convenience.

h. Minimum luminance (excluding 0 and 255). The minimum luminance of the picture is determined.

i. Maximum luminance (excluding 0 and 255). The maximum luminance of the picture is determined. The minimum and maximum luminances provide the luminance range.

The sum of the square errors for the above features may be determined. (In some cases, the sum of the absolute differences for the above features may be sufficient.) The sum of the square errors may be used to determine how different or similar one set of features is from the other set of features, and thus how different or similar are the pictures.

Figure 5:
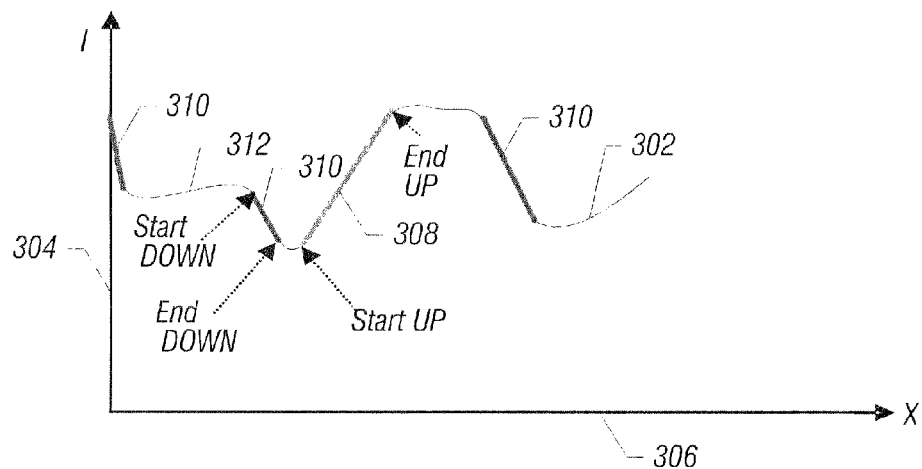
FIG. 5 is a depiction of hypothetical gradient runs in accordance with one embodiment of the present invention.

FIG. 5 illustrates an example graph of a gradient run function. For edge-related features, gradient runs may be used to detect edges. Gradient runs are piecewise linear approximations of an edge contour. In particular, gradient runs are sets of pixels in a single direction which have the same gradient (or gradient in a certain range). To compute gradient runs, rows or columns in the image may be used. To avoid noise, a low pass filter, such as a Gaussian 1D filter, may be applied before computing the gradient runs. A gradient run may be a 5-tuple with the following elements (for a horizontal gradient run):

$$\langle X_1, X_2, y, Z_1, Z_2 \rangle = HR_y$$

where $X_1$ is the coordinate of the start of the run, $X_2$ is the coordinate of the end of the run, y is the row index, and $Z_1/Z_2$ are the image values $f(X_1,y)/F(X_2,y)$.

The construction of gradient runs is essentially a piecewise linear approximation of the function $f$. A profile of line 302 of an exemplary image including horizontal gradient runs associated with line 302 is shown in FIG. 5. Horizontal gradient runs are edges detected in the horizontal direction. Vertical axis 304 represents the pixel intensity or luminance and horizontal axis 306 represents the pixel position. In general, runs computed on picture lines may be referred to as horizontal runs and runs computed on picture columns may be referred to as vertical runs. Within horizontal/vertical runs may be up-runs and down-runs, such as up-runs 308 and down-runs 310. The length of the gradient runs is the sum of all lengths 308 and 310.

The straight lines are the runs, built from left to, right. The elements of one of the runs are shown. For an edge to be considered, it preferably has a slope above a selected threshold. In particular, the run detection uses a threshold, thus, only edges steeper than a certain value are considered. A flat region without strong gradient, such as illustrated by 312, is not considered. The average luminance of a run and over all runs combined with overall average, maximum, and minimum luminance are characteristic features of a picture.

The number of runs is actually the number of edges, and the sum of run lengths (sum of $x_2-x_1$ for all runs) indicates the extent of the edges. The process may be implemented over an entire image, or a small region within, or even in one direction only.

Thus, referring to FIG. 5, the flat region 312, without strong gradient, is ignored. Immediately thereafter, there is the start of a down run 310, as indicated at start down, which ends as indicated by the phrase "end down." Then, an up run 308 starts at start up, followed by an end up at the end of the run. Thus, four gradient runs are illustrated. A gradient run can be of any length of two or more pixels, but each gradient run counts the same, regardless of its length, in one embodiment. In other words, the number of gradient runs are counted, not their length, in some embodiments. In order to constitute a gradient run there must be at least two successive pixels that increase or decrease in intensity by at least the predetermined threshold value over their preceding neighbor in one embodiment.

A threshold minimum number of pixels to form a gradient run may be set. If spike noise may be present, a threshold of three pixels may be used.

Thus, for each column, in one embodiment, the number of gradient runs, either up or down, are counted. Then, an appropriate algorithm may be utilized to determine if two successive fields or frames are the same. In other words, a determination may be made as to whether two successive fields or two successive frames are identical because they have substantially the same number of gradient runs. In some embodiments, rather than looking at the entire gradient run including its start up and its end up or its start down (SuC) and its end down (SdC), the total number of start ups and the total number of start downs may simply be counted.

Figure 6:
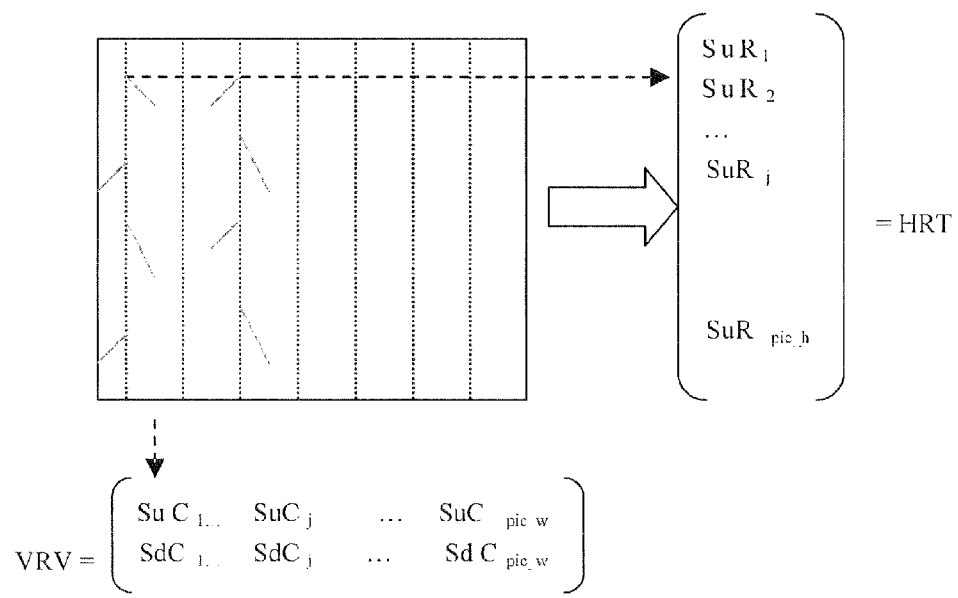
FIG. 6 is a depiction of extracting gradient runs from a video frame in accordance with one embodiment of the present invention.

Referring to FIG. 6, each hash to the left of a vertical column line indicates a gradient down run and each hash to the right indicates a gradient up run for a given column. For each column, the number of up runs and down runs may be determined to come up with an array labeled VRV. In some embodiments, it may also be desirable to develop an array labeled HRT with the same information on a row basis including start up row (SuR) and start down row (SdC). Then, the sum of absolute differences or other appropriate measure may be utilized between two frames or fields to detect repetition. The sum of the absolute differences can be checked against a detection threshold to decide if two frames or fields are the same.

Figure 7:
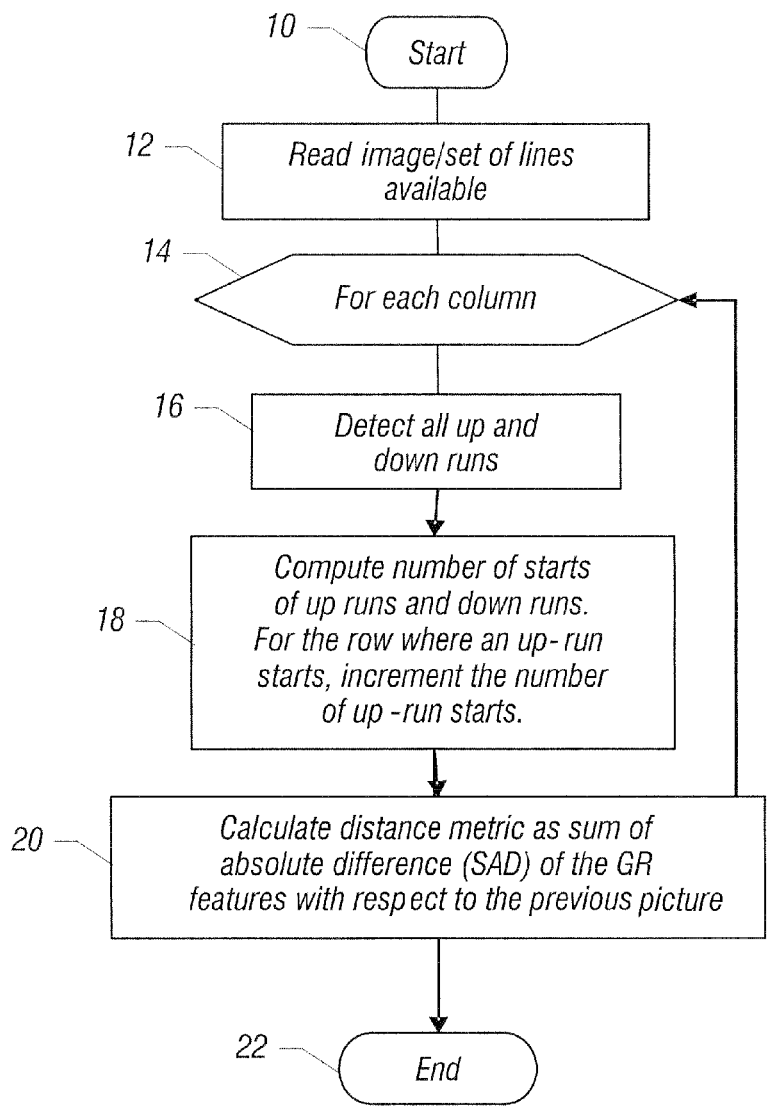
FIG. 7 is a flow chart for a gradient run calculation in accordance with one embodiment of the present invention.

Referring to FIG. 7, in accordance with one embodiment, a process 10 may determine whether or not two fields or frames are the same. That process may be implemented by software, hardware, or firmware in various embodiments.

Initially, an image or set of lines is read in block 12. Then, for each column, as indicated at 14, all the up runs and the down runs may be detected as indicated at block 16. The up runs and the down runs, in one embodiment, may be detected by merely detecting the start of the up run or the start of the down run as indicated in block 18. Then, the gradient runs may be counted per column by counting the number of rows where up runs start only, in an embodiment that only counts up runs. Finally, in an embodiment in which only one direction is used, a distance metric is calculated as the threshold sum of absolute differences of the gradient parameters with respect to the previous picture, be it a frame or a field as indicated in block 20.

Figure 8:
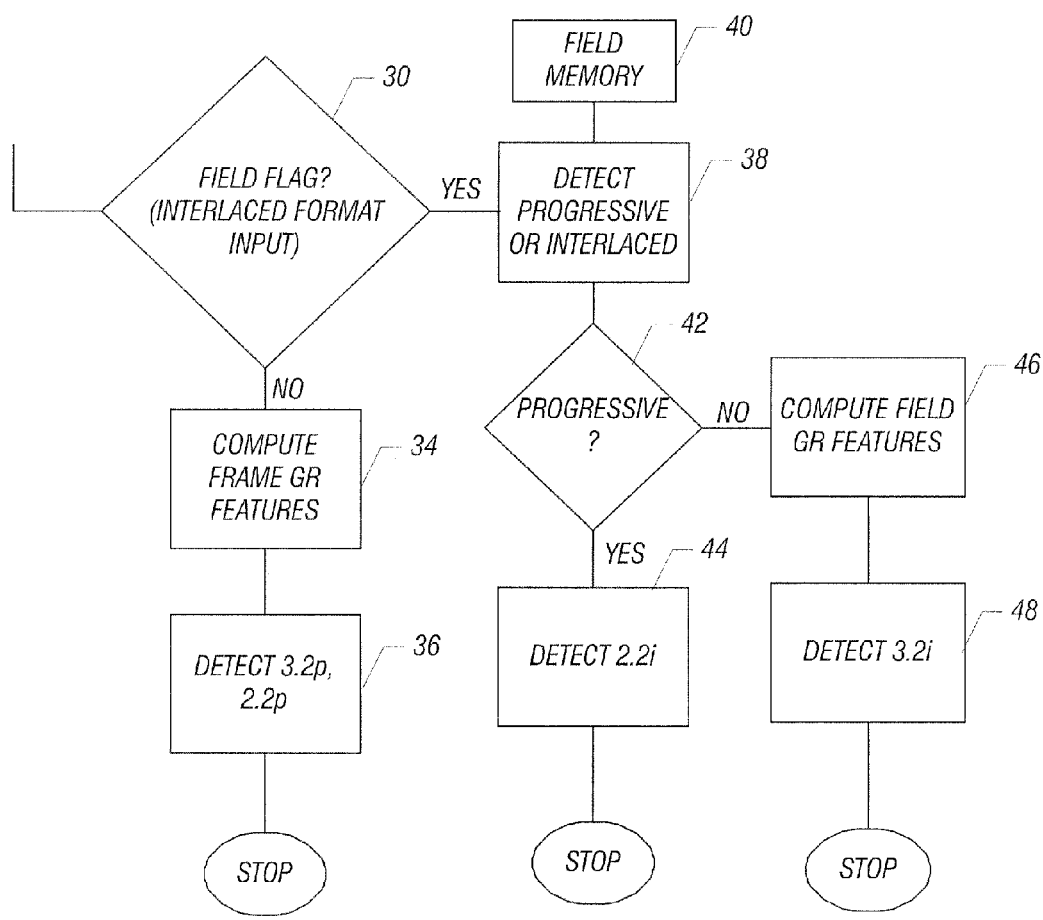
FIG. 8 is a depiction of how interlaced and progressive data are distinguished in some embodiments of the present invention.

An overall process, depicted in FIG. 8, in some embodiments, may be implemented by hardware, software, or alternatively, firmware. The overall process begins by checking a field flag as indicated in diamond 30 in FIG. 8. The field flag indicates whether the received video data is in fields or frames. If the field flag indicates that fields are utilized, then the flow moves to block 38.

In block 38, a check determines whether or not the data within the field is actually progressive or interlaced. The techniques used, in some embodiments, for making this determination will be described later. In addition, a gradient memory 40 may be utilized to store the gradient features from the previous field so differences with the current field can be computed. If the combing pattern counts of the previous field is pre-computed, the memory 40 may be unnecessary. A check at diamond 42 determines if the data is progressive. Based on the repetition between one field and a previous field, using gradient analysis of the field features (block 46), the video data may be determined to be 3:2 pulldown interlaced (block 48). Otherwise, if the field is progressive, it is 2:2 pulldown interlaced format as indicated in block 44.

Conversely, if the field flag indicates frame format data, then, in block 34, the gradient analysis is conducted on a frame basis. Then, 3:2 pulldown progressive may be distinguished from 2:2 pulldown progressive as indicated in block 36.

As pointed out above, a frame may contain true progressive content or it may contain two interlaced fields put together. Horizontal motion causes a combing pattern for any non-horizontal edges. Thus, an interlaced frame shows more combing than either of its constituent fields, while a progressive frame shows a pattern similar to that found in any of its fields. Combing is effectively a pattern of light and dark lines formed at the edges of images depicted within a frame or a field.

A combing pattern present in an interlaced frame may be used to detect interlaced content. Combing may be detected by locking at patterns in the signed differences between successive pixels in a column-wise direction. Thus, for example, going from left to right along a column, intensity differences for column values are calculated, stored, and thresholded.

A positive peak is detected if the difference value of a previous location and the current location is positive and above a positive threshold. A negative peak is detected if the same difference is negative and below a negative threshold.

Figure 9:
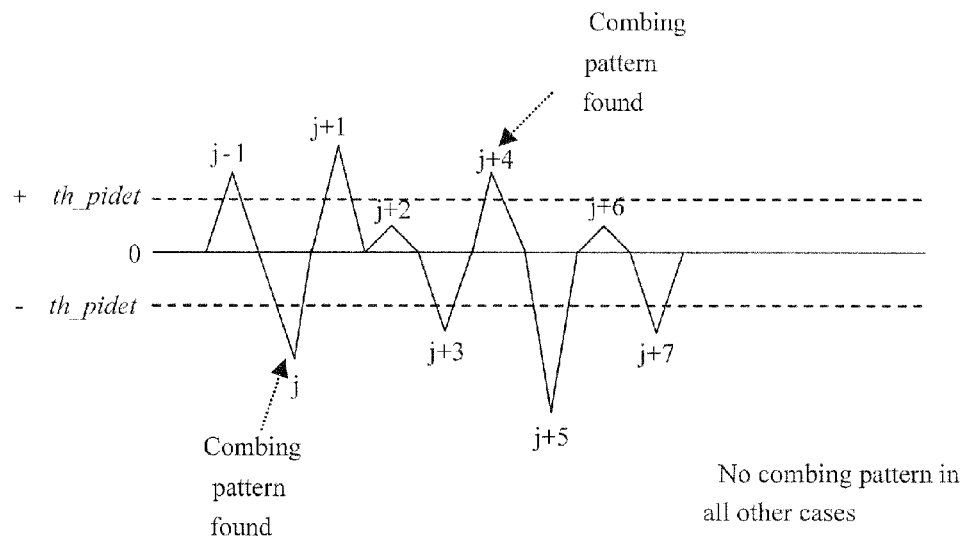
FIG. 9 is a hypothetical graph of different values for combing pattern detection in accordance with one embodiment of the present invention.

Thus, referring to FIG. 9, a positive peak at J+4 is detected in this example since its difference value at J+4 minus the value at location J+3 is positive, and above the threshold (+th_pidet). A negative peak at J, in FIG. 9, is detected because the difference between the value at J minus the value at J−1 is negative and below (−th_pidet). Using a similar analysis, a combing pattern was detected at J−1, J, J+1, J+3, J+4, J+5, and J+7, but not at J+2 or J+6 in FIG. 9. For this segment, the combing pattern count is seven.

Figure 10:
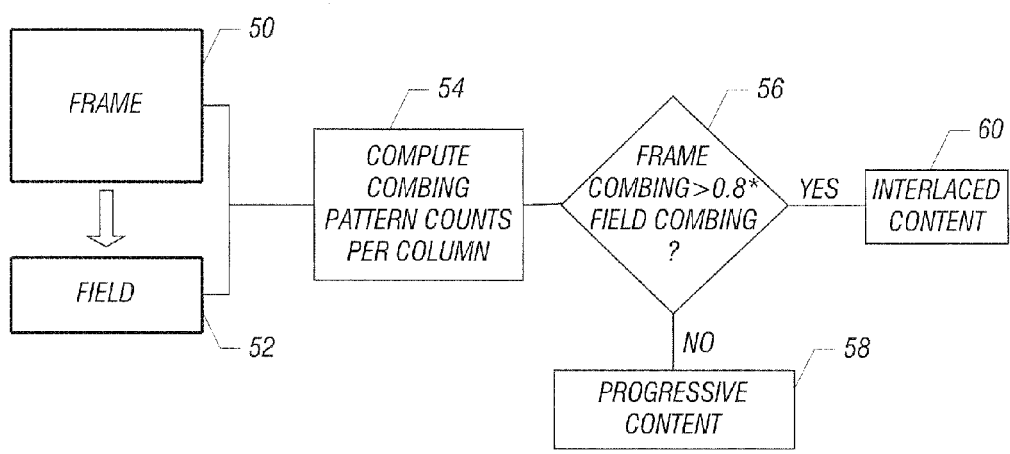
FIG. 10 is a flow chart for determining whether video data is interlaced or progressive in accordance with one embodiment of the present invention.

Then, referring to FIG. 10, a process may be implemented in software, hardware, or firmware. The process begins by reading in a frame 50 and one of its fields, field 52. In other words, the combing pattern counts of a field of the frame is compared to those of the frame as a whole that includes that field. At block 54, a combing pattern in counts per column is determined. A count occurs where a combing pattern was found along a column. As indicated in diamond 56, if the frame combing count is greater than 0.8 times the field combing count, then interlaced content is indicated in block 60 and, otherwise, progressive content is indicated in block 58.

Figure 11:
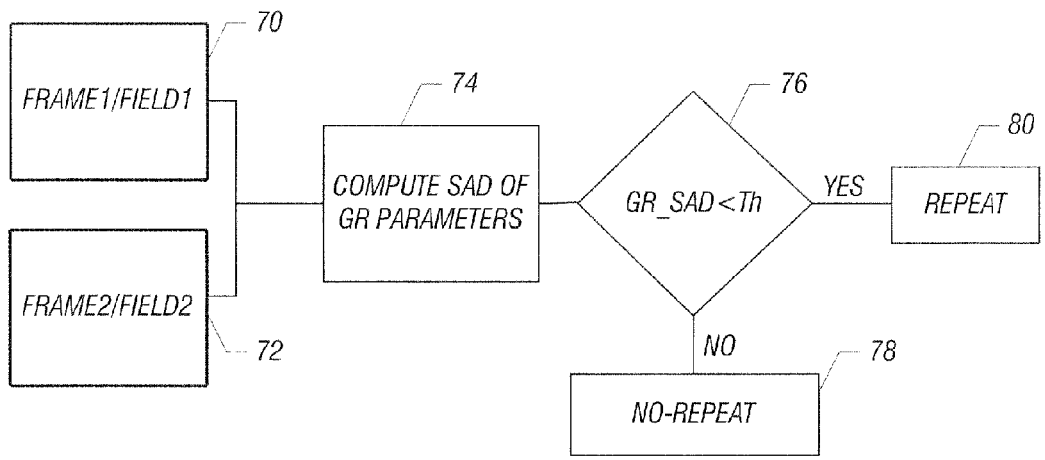
FIG. 11 is a flow chart for determining the frame or field repetition in accordance with one embodiment of the present invention.

Moving next to FIG. 11, the gradient of a first field or frame 70 is determined and the gradient for a next field or frame 72 is determined. Using the sum of absolute differences or other appropriate metrics applied to the gradient run features, the gradient parameters for the fields or frames being compared may be analyzed as indicated in block 74. Then, if the sum of absolute differences of the gradient run features is less than a threshold, as indicated in diamond 76, a repeat is identified, as indicated in block 80, and, otherwise, no repeat is indicated as indicated in block 78.

Thus, the repetitive pattern generated by gradient runs may be used to detect 3:2 and 2:2 pulldowns. For example, 3:2 interlaced and 3:2 progressive pulldowns are obtained when 24 frames per second progressive cinematic video is converted to 60 fields per second interlaced or 60 frames per second progressive format, respectively.

Figure 12:
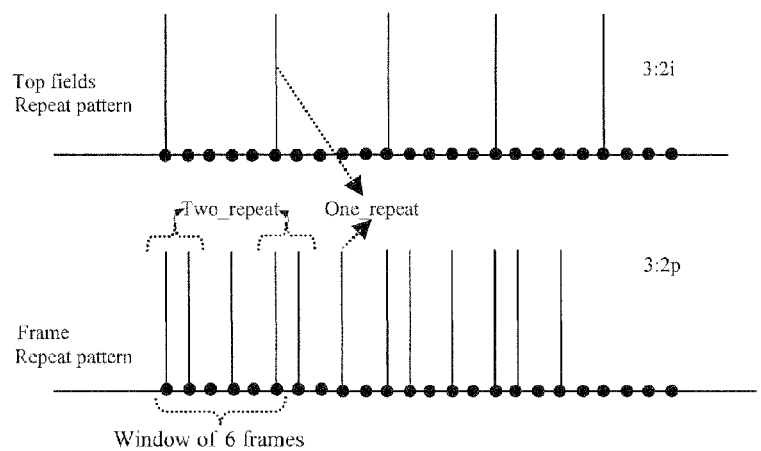
FIG. 12 shows the field and frame repeat patterns for 3:2 pulldown interlaced and 3:2 pulldown progressive data in accordance with one embodiment of the present invention.

The field and frame repeat pattern for 3:2 interlaced and 3:2 progressive is shown in FIG. 12. Thus, for 3:2 interlaced, a single repeat (one_repeat) of the top field is found twice in a window of 6 fields. For 3:2 progressive, there is one two_repeat and two one_repeats in a 6-frame window.

In the case of 2:2 interlaced, as described above, there is no field repetition, but each displaced interlaced frame is a progressive frame. This format may be obtained when 25 frames per second progressive or 30 frames per second progressive input is converted to a 50 frames per second interlaced or 60 frames per second sequence respectfully.

In the case of 2:2 progressive, there is a frame repetition to double the frame rate. This format is obtained when 25 frames per second progressive or 30 frames per second progressive input is converted into a 50 or 60 frames per second progressive sequence respectively.

Figure 13:
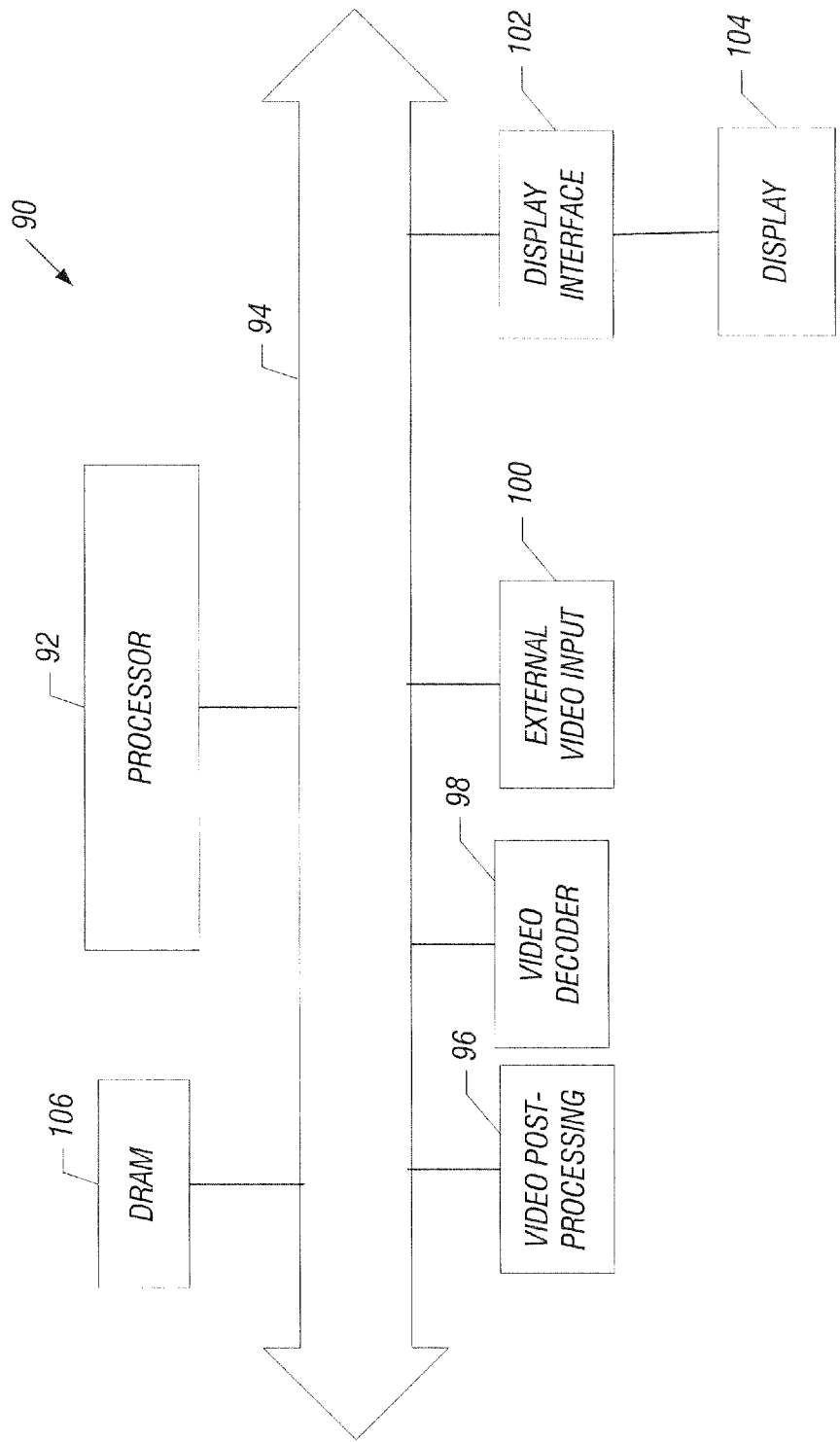
FIG. 13 is a schematic depiction of a video apparatus in accordance with one embodiment of the present invention.

Referring to FIG. 13, a video apparatus 90 may be in the form of a personal computer, a media display device, or a television, to mention a few examples. It may include a bus 94 which is coupled to one or more processors 92. Also coupled to the bus 94 may be a system memory in the form of a dynamic random access memory (DRAM) 106 in one embodiment. In embodiments where software is used to implement any of the processes described herein, that software may be stored on a computer readable medium such as the DRAM 106.

Also coupled to the bus 94 may be a video post-processing unit 96. Input video, whose format needs to be determined, may be passed to the video decoder 98 through the bus and can be stored on the DRAM 106. Thereafter, in a video post-processing unit 96 (which may read and write data back to memory), the format determinations described herein may be implemented.

Also coupled to the bus 94 may be an external video input 100 which contains digital video in digital format (which may have been decoded) for which it is necessary to determine the type of content as well. Finally, a display 104, such as a television or monitor, may be coupled through a display interface 102 to the bus 94. In some cases, the display interface 102 may make necessary format conversion changes using the information about the received format from the video post-processing unit 96.

For example, for a large screen display, if the video post-processing unit 96 indicates that the data is 3:2 interlaced, it may be desirable to change the data into a progressive format. This may be done, for example, by the display interface 102, the video post-processing unit 96, or other components. In some embodiments of the present invention, the post-processing may be implemented in software and in other embodiments it may be implemented in firmware or hardware.

Figure 14:
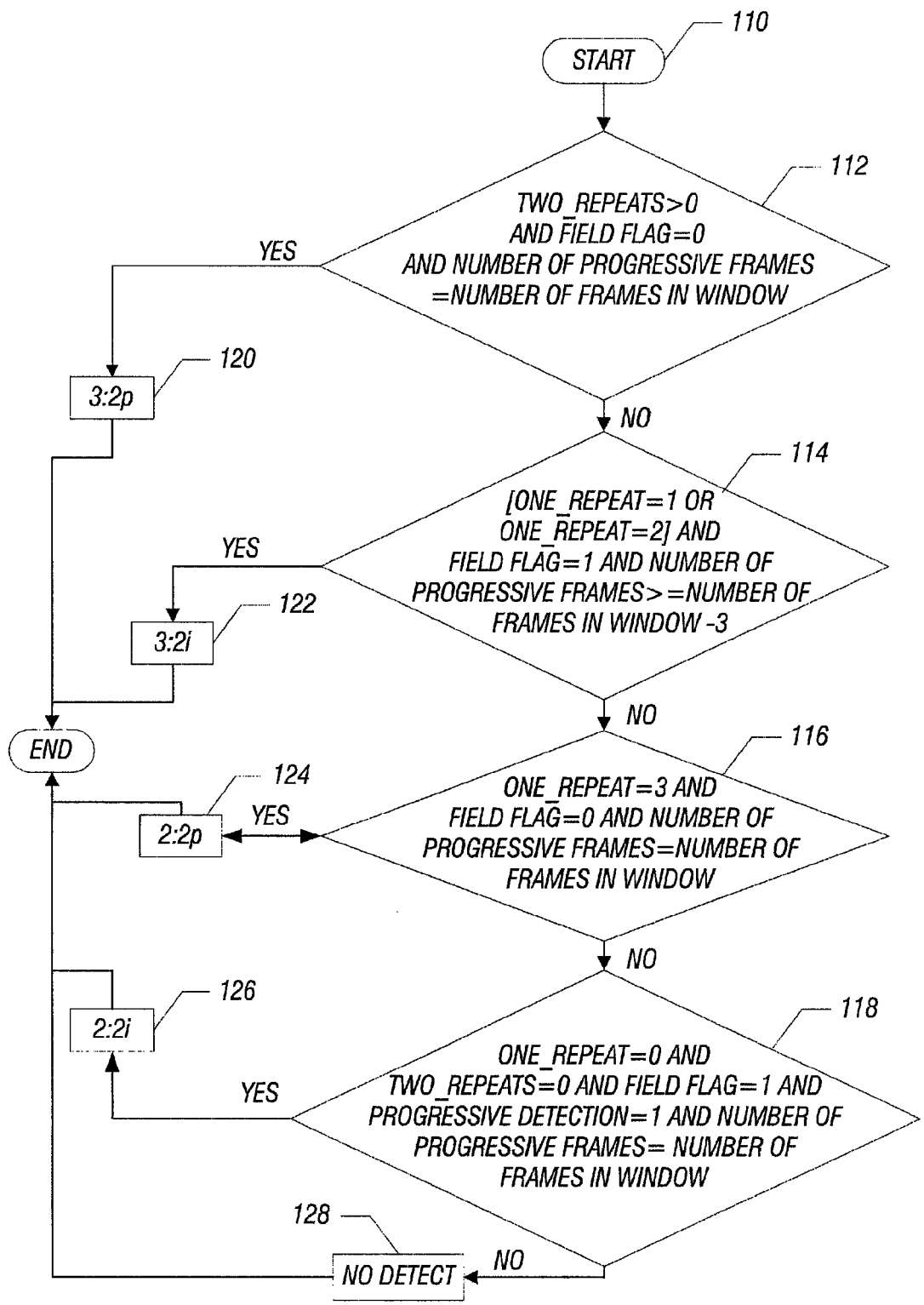
FIG. 14 is a flow chart for determining the type of video data in accordance with one embodiment of the present invention.

Referring to FIG. 14, the ultimate determination of the video format begins at block 110. If there are more than one two_repeat patterns, the field flag equals zero and the number of progressive frames equal the number of frames in the window of observation (e.g. six frames), as determined at diamond 112, then the data is 3:2 progressive as indicated in block 120.

If not, a check at diamond 114 determines whether there is one single-repeat of two one-repeat patterns for the fields, if the field flag is equal to one and the number of progressive frames is greater than or equal to the number of frames in the window minus three. If so, 3:2 interlaced format is detected as indicated in block 122.

If not, a check at diamond 116 determines whether three one_repeat patterns, a field flag equal to zero, and a number of progressive frames equal the window size exist. If so, 2:2 progressive is indicated at 124.

Otherwise, a check at diamond 118 determines whether there are no one_repeat or two_repeats, the field flag is equal to one, the number of progressive frames equals the window size and the progressive detector, based on combing in one embodiment, indicates that the data is interlaced. If so, 2:2 interlaced is indicated at 126. Otherwise, the data is not data which has any concealed characteristics and no detection is required as indicated in block 128.

Figure 15:
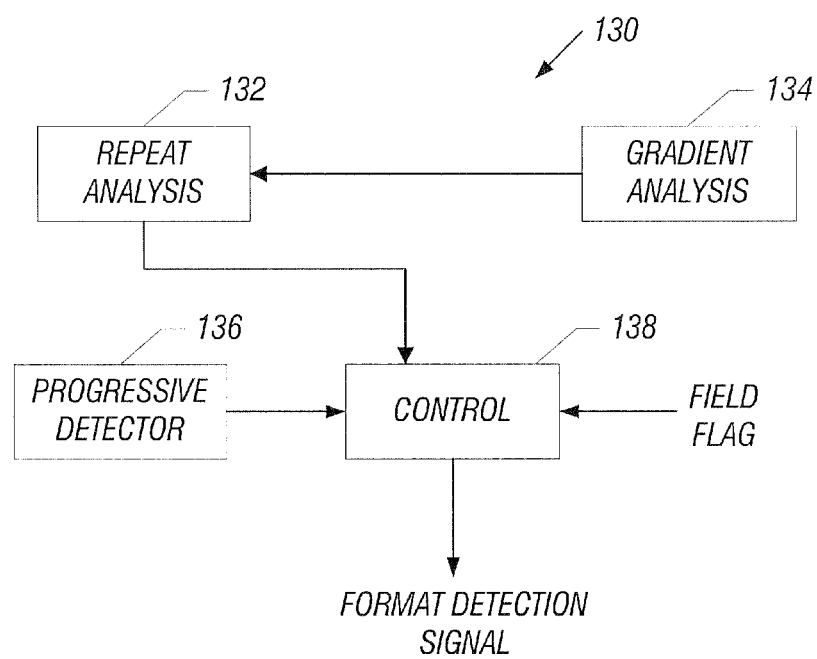
FIG. 15 is a schematic depiction of hardware for detecting the type of video data in accordance with one embodiment of the present invention.

Referring to FIG. 15, a video display apparatus 130, in accordance with some embodiments, may include a repeat analysis unit 132 to determine whether fields or frames repeat and, if so, in what pattern. In one embodiment, the repeat analysis may be implemented using data from a gradient analysis device 134. Thus, once the gradients have been received by the unit 132, the pattern of repetition over a window size, such as six frames, is determined in the repeat analysis unit 132. The repeat pattern may be provided to control 138. In addition, the control 138 may receive a field flag which indicates the field or frame format of the data. Finally, a progressive detector 136 provides progressive format information to the control 138. The progressive detector 136 may use the combing analysis described herein in some embodiments. Based on all of this information and using the protocol set forth in FIG. 14, in one embodiment, the control 138 makes the determination of the type of video data involved.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   determining information about luminance of temporally successive pictures;

determining information about changes of intensities of a series of two or more side-by-side pixels, for said temporally successive pictures;

determining how many pixels are part of series extending in one direction;

identifying a format of video data using said information about luminance and said number of pixels; and determining the minimum and maximum luminance of said temporally successive pictures.

2. The method of claim 1 including determining a video repeat pattern and using said repeat pattern to identify a format of video data.

3. The method of claim 2 including analyzing changes of pixel intensity versus pixel position for successive pixels in a row or column to determine said video repeat pattern.

4. The method of claim 1 including determining the sum of the series of pixels extending in each of at least two directions.

5. The method of claim 3 wherein analyzing changes of pixel intensity includes determining the number of times pixel intensity changes from one pixel to the next pixel by at least a threshold value.

6. The method of claim 5 including determining the number of times that the rate of change of pixel intensity starts up or starts down by a given threshold value.

7. The method of claim 1 including distinguishing between 2:2 and 3:2 pulldowns.

8. The method of claim 7 including distinguishing between progressive and interlaced video.

9. The method of claim 1 including using combing analysis to determine whether data is progressive or interlaced.

10. The method of claim 9 wherein using combing analysis includes determining whether the difference between successive pixel values exceeds a threshold.

11. The method of claim 10 including determining a pattern in signed differences between pixel values.

12. The method of claim 11 including counting the changes in pixel values to determine a combing count.

13. The method of claim 12 including determining whether a combing count for a frame exceeds 0.8 times a combing count for a field within said frame.

14. An apparatus comprising:

a device to determine information about luminance of temporally successive pictures, determine information about changes of intensities of a series of side-by-side pixels, for said temporally successive pictures, determine how many pixels are part of series extending in one direction and identify a format of video data using said information about luminance and said number of pixels, said device to determine the minimum and maximum luminance of said temporally successive pictures; and a memory coupled to said device.

15. The apparatus of claim 14, said device to determine a video repeat pattern and using said repeat pattern to identify a format of video data.

16. The apparatus of claim 15, said device to analyze changes of pixel intensity versus pixel position for successive pixels in a row or column to determine said video repeat pattern.

17. The apparatus of claim 14, said device to determine the sum of the series of pixels extending in each of at least two directions.

18. The apparatus of claim 16, said device to analyze changes of pixel intensity includes determining the number of times pixel intensity changes from one pixel to the next pixel by at least a threshold value.

19. The apparatus of claim 18, said device to determine the number of times that the rate of change of pixel intensity starts up or starts down by a given threshold value.

20. The apparatus of claim 14, said device to distinguish between 2:2 and 3:2 pulldowns.

21. The apparatus of claim 20, said device to distinguish between progressive and interlaced video.

22. The apparatus of claim 14, said device to use combing analysis to determine whether data is progressive or interlaced.

* * * * *